US007978123B2

(12) United States Patent
Lam et al.

(10) Patent No.: US 7,978,123 B2
(45) Date of Patent: Jul. 12, 2011

(54) SYSTEM AND METHOD FOR OPERATING A RADAR SYSTEM IN A CONTINUOUS WAVE MODE FOR DATA COMMUNICATION

(75) Inventors: Juan F. Lam, Manhattan Beach, CA (US); Scott D. Whittle, Templeton, MA (US); Min S. Hong, Montebello, CA (US); Charles F. Kaminski, Manhattan Beach, CA (US); Robert E. Shuman, Torrance, CA (US); Harold B. Rounds, Torrance, CA (US); Daniel D. Gee, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 186 days.

(21) Appl. No.: 12/435,379

(22) Filed: May 4, 2009

(65) Prior Publication Data

US 2010/0277372 A1    Nov. 4, 2010

(51) Int. Cl.
*G01S 13/08* (2006.01)
(52) U.S. Cl. .......................... 342/134; 342/175; 342/202
(58) Field of Classification Search ...................... 342/57
See application file for complete search history.

(56) References Cited

U.S. PATENT DOCUMENTS

| | | | |
|---|---|---|---|
| 4,445,119 A | 4/1984 | Works | |
| 4,980,691 A | 12/1990 | Rigg et al. | |
| 5,225,841 A | 7/1993 | Krikorian et al. | |
| 5,298,906 A | 3/1994 | Lantagne et al. | |
| 5,966,091 A | 10/1999 | Andersson | |
| 5,986,590 A | 11/1999 | Smith et al. | |
| 5,999,119 A | 12/1999 | Carnes et al. | |
| 6,342,851 B1 * | 1/2002 | Andersson | 342/134 |
| 6,366,259 B1 | 4/2002 | Pruett et al. | |
| 6,518,917 B1 * | 2/2003 | Durfee et al. | 342/160 |
| 6,954,173 B2 | 10/2005 | Mrstik | |
| 6,965,349 B2 | 11/2005 | Livingston et al. | |
| 6,977,610 B2 | 12/2005 | Brookner et al. | |
| 7,274,328 B2 | 9/2007 | McIntire et al. | |
| 7,359,639 B2 | 4/2008 | Wolcott et al. | |
| 2005/0206563 A1 | 9/2005 | Guy | |
| 2007/0087695 A1 * | 4/2007 | Cohen et al. | 455/63.4 |
| 2007/0132631 A1 | 6/2007 | Henson et al. | |
| 2007/0139253 A1 | 6/2007 | Meyers et al. | |
| 2008/0191005 A1 * | 8/2008 | Arpino | 235/376 |
| 2008/0291087 A1 * | 11/2008 | Tietjen et al. | 342/372 |

FOREIGN PATENT DOCUMENTS

EP    0 614 092 A1    9/1994

OTHER PUBLICATIONS

Tavik, et al., "The Advanced Multifunction RF Concept", IEEE Transactions On MIcrowave Theory and Techniques, vol. 53, No. 3, Mar. 2005 (pp. 1009-1020).

(Continued)

*Primary Examiner* — Thomas H Tarcza
*Assistant Examiner* — Timothy A Brainard
(74) *Attorney, Agent, or Firm* — Christie, Parker & Hale, LLP (57) ABSTRACT

A system and a method for operating a radar system in a continuous wave mode for communicating information are provided. In one embodiment, the invention relates to a method for operating a radar system, having an antenna including a plurality of active array elements, in a continuous wave mode to communicate information, the method including receiving an instruction to enter the continuous wave mode, loading a plurality of tables, where each table includes information indicative of a primary group of the active array elements to be activated and a secondary group of elements to be deactivated, receiving a communication signal to be transmitted, and providing, repeatedly, the communication signal, for a preselected period of time, to the primary group of elements of each of the plurality of tables.

20 Claims, 7 Drawing Sheets

OTHER PUBLICATIONS

European Search Report for European Application No. 10250869.4-2220, European Search Report dated Jul. 27, 2010 and mailed Aug. 3, 2010 (7 pgs.).

L-3 Communications, Communication Systems—West; "Mini TCDL Transceiver"; Apr. 4, 2008; 2 pages.

L-3 Communications, Communication Systems—West; "Multi-Role Tactical Common Data Link (MR-TCDL)"; Apr. 4, 2008; 2 pages.

http://www.globalsecurity.org/intell/systems/cdl.htm; "Common Data Link [CDL]"; Nov. 14, 2009; 6 pages.

* cited by examiner

FIG. 11

SYSTEM AND METHOD FOR OPERATING A RADAR SYSTEM IN A CONTINUOUS WAVE MODE FOR DATA COMMUNICATION

FIELD OF THE INVENTION

The present invention relates generally to the operation of radar systems for communication. More specifically, the invention relates to a system and a method for operating a radar system in a continuous wave mode for communicating information.

BACKGROUND

Both military and commercial vehicles commonly include radar systems for identifying fixed and moving objects, terrain and weather, among other things. Such vehicles can include aircraft, land vehicles, ships or other vehicles having radar systems. Users of military and commercial vehicles often need to communicate information with other such users or various base stations. Conventional communication systems for such vehicles often allow for only low bandwidth communications using limited radio frequency (RF) power. In general, such limited communication systems are separate and independent systems from the radar systems.

The radar systems in such vehicles generally include active electronically scanned arrays (AESA) or active phased array radar systems which can identify the range, altitude, direction, or speed of both moving and fixed objects such as aircraft, ships, motor vehicles, weather formations, and terrain. Active array radar systems are electrically steerable. Thus, unlike mechanical arrays, active arrays are capable of steering electromagnetic waves used for radar without physical movement. Such electronically steered antennas include individually electronically controlled steering devices behind each antenna element. Each steering device can manipulate the time delay or phase of the signal passing through it. With a beam steering computer controlling each element, the beam direction and shape can be digitally controlled within a relatively short time period.

Users of military and commercial vehicles today need to send and receive information about terrain, weather, threats and targets. Such information can be stored in digital files such as image files, video files or real-time data files, which are often large in size. This information is often time sensitive and may therefore need to be communicated very rapidly. Systems capable of enabling the communication of large data files over long distances for users of such vehicles have been proposed. However, such communication systems typically require sophisticated and bulky antennas which introduce interference with other on-board antenna systems. Also, such proposed systems can require a number of additional electronic components. Therefore, a system enabling high speed communication of large data files over long distances for commercial and military vehicles is needed.

SUMMARY OF THE INVENTION

Aspects of the invention relate to operation of a radar system in a continuous wave mode for communicating information. In one embodiment, the invention relates to a system and a method for operating a radar system, having an antenna including a plurality of active array elements, in a continuous wave mode to communicate information, including receiving an instruction to enter the continuous wave mode, loading a plurality of tables, where each table includes information indicative of a primary group of the active array elements to be activated and a secondary group of elements to be deactivated, receiving a communication signal to be transmitted, and providing, repeatedly, the communication signal, for a preselected period of time, to the primary group of elements of each of the plurality of tables. In other embodiments, the loading the plurality of tables includes creating the plurality of tables. In one such case, the creating the plurality of tables includes dividing, randomly, the plurality of active array elements into each of the primary groups.

DETAILED DESCRIPTION OF THE INVENTION

Referring now to the drawings, embodiments of active array radar systems that operate in a continuous wave mode to enable data communication are illustrated. In many embodiments, the active array radar systems also operate in a conventional mode to enable radar functionality. Embodiments of active array radar systems operating in continuous wave modes can randomly assign each of the active array antenna elements to a number of discrete groups of elements. In many embodiments, the elements of each of the groups of elements are activated repeatedly in a round robin fashion for an equal period of time while the elements of the other groups are deactivated. In a number of such embodiments, the radar system effectively transmits a beam that appears continuous even though not all of the elements are activated simultaneously.

In many embodiments, active array radar systems operating in continuous wave mode can communicate with conventional continuous wave communication systems. As the majority of conventional communication devices in use today operate in continuous wave modes, embodiments of the current invention can enable communication with a wide range of conventional devices and communication systems without requiring additional components for commercial and military vehicles already having active array radar systems.

Continuous wave radar systems have been proposed. For example, a continuous wave range measuring system is described in U.S. Pat. No. 5,999,119 to Carnes et al. However, such systems have not used continuous wave radar for communications. In addition, such systems have not incorporated continuous wave operation with active array radar systems. Instead, such conventional systems typically include an antenna specifically designed for use with a continuous wave radar system.

Figure 1:
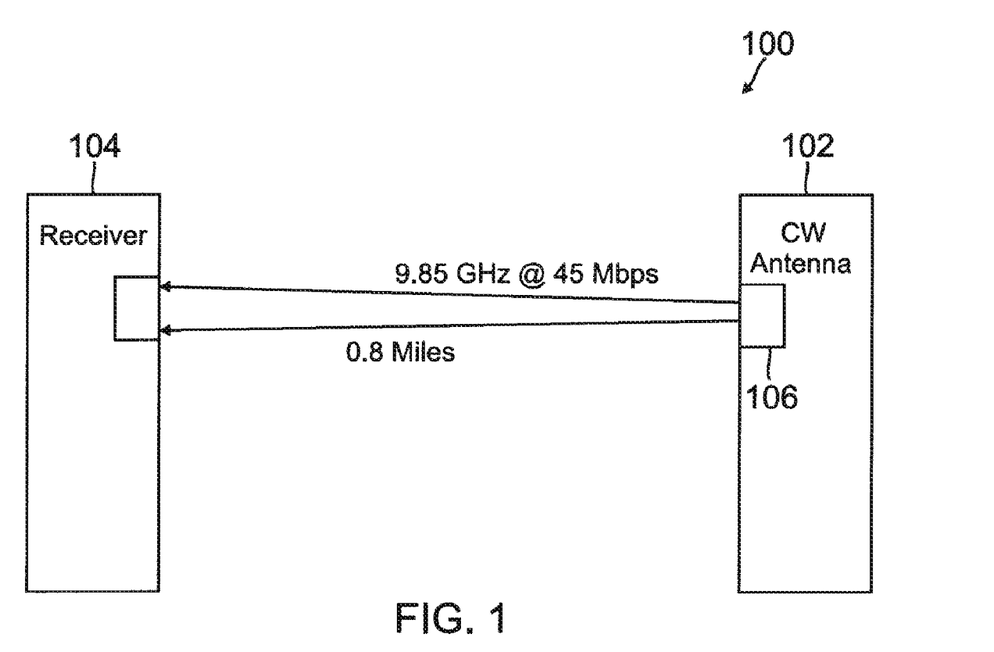
FIG. 1 is a schematic block diagram illustrating a communication system including an active array radar system communicating at high speeds with a continuous wave receiving device in accordance with one embodiment of the present invention.

FIG. 1 is a schematic block diagram illustrating a communication system 100 including an active array radar system 102 communicating at high speeds with a continuous wave receiving device 104 in accordance with one embodiment of the present invention. The active array radar system 102 includes an active array antenna 106 having a number of active array elements (not shown) operated in a continuous wave mode by a beam steering computer (not shown). In the illustrated embodiment, data is transmitted by the continuous wave radar system 102 to the receiving device 104 over a distance of approximately one mile. In other embodiments, the radar system can communicate across much longer distances.

In one embodiment, the continuous wave radar system 102 operates in the X-Band at approximately 9.85 gigahertz (GHz). In other embodiments, the continuous wave radar system can communicate using other carrier frequencies. In several embodiments, the continuous wave radar system 102 sends and receives data at up to, or above, 45 mega bits per second (Mbps). In a number of embodiments, the communication system 100 is an experimental system that demonstrates use of a continuous wave mode for an active array antenna operating in a high speed data communication mode.

Figure 2:
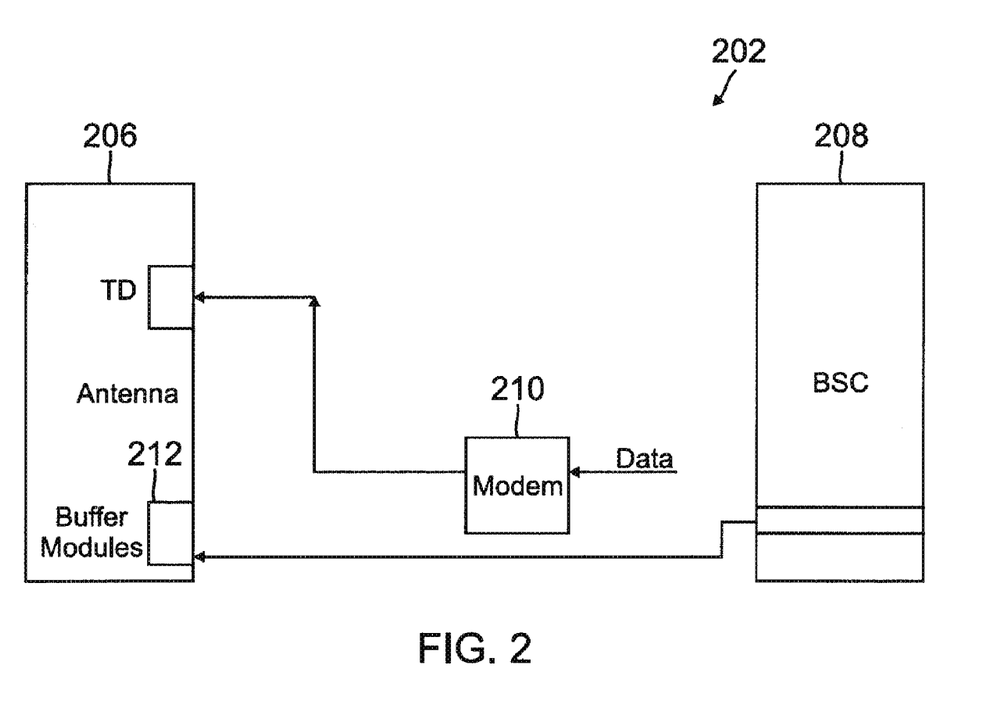
FIG. 2 is a schematic block diagram illustrating an active array radar system having an active array antenna controlled by a beam steering computer in accordance with one embodiment of the present invention.

FIG. 2 is a schematic block diagram illustrating an active array radar system 202 having an active array antenna 206 controlled by a beam steering computer 208 in accordance with one embodiment of the present invention. The radar system 202 includes the active array antenna 206 coupled to the beam steering computer 208 and to a modem 210. In operation, the modem 210 receives information to be transmitted from a data source. The modem 210 modulates the information onto a carrier signal and provides the modulated signal, including the encoded information, at the carrier frequencies to the active array antenna 206 to be transmitted.

The beam steering computer 208 controls steerable phase control elements of the active elements of the active array antenna 206. The beam steering computer 208 can receive a number of tables having groups of elements collectively representing each of the elements of the active array antenna 206. The beam steering computer 208 can receive the tables from an external device (not shown) and store them in one or more buffer modules 212 of the active array antenna 206. In several embodiments, the beam steering computer 208 creates the tables by randomly assigning elements of the active array antenna to each group such that all of the elements are assigned and the sizes of all of the groups are approximately equal. In other embodiments, the external device or other means creates the tables by randomly assigning elements of the active array to each group such that all of the elements are assigned and the sizes of all of the groups are approximately equal. In one embodiment, the number of tables, or corresponding groups of elements, can be four. For example, an active array antenna can have 400 elements. In such case, the 400 elements can be randomly assigned to four groups of 100 elements that can be activated independently in a round robin fashion. In a number of embodiments, the number of tables/groups can be greater than or equal to two. In other embodiments, data structures other than tables can be used to store groups of elements to be activated.

The active array antenna 206 can be an active electronically scanned array (AESA) or active phased array antenna having a number of individual antenna elements (not shown). The active array antenna 206 can include a number of individually electronically controlled steering devices (not shown) coupled to each antenna element. Each steering device can manipulate the time delay or phase of the signal passing through it. In a number of embodiments, the steering device is a phase shifter. With the beam steering computer 208 controlling each element, the beam direction and shape can be digitally controlled within a relatively short time period. Examples of active array antenna systems can be found in U.S. Pat. No. 6,366,259 to Pruett et al., U.S. Pat. No. 6,965,349 to Livingston et al., and U.S. Pat. No. 7,274,328 to McIntire et al., the entire content of each patent is expressly incorporated herein by reference.

In the illustrated embodiment, the modem 210 is a tactical common data link (T-CDL) type modem. The modem 210 can be configured for either surface or airborne use. The modem can be compliant with the CDL specification. The Common Data Link (CDL) specification and associated communication program is designed to achieve data link interoperability and provide seamless communications between multiple intelligence, surveillance, and reconnaissance (ISR) systems operated by armed services and government agencies. The CDL specification can provide for full-duplex, jam resistant, digital microwave communications between the ISR sensor, sensor platform, and surface terminals. The CDL program can establish data link standards and specifications identifying compatibility and interoperability requirements between collection platforms and surface terminals across user organizations.

The modem 210 can operate in the X-Band. In some embodiments, the modem 210 operates at approximately 9.85 GHz and supports data rates of up to 45 Mbps. In many embodiments, the modem uses phase modulation to exchange data with other communication terminals/nodes. In several embodiments, the modem includes input/output ports supporting Ethernet and RS-232 protocols. In the illustrated embodiment, the modem can be coupled to a data source providing data via an Ethernet connection. In one embodiment, the modem is an off the shelf type component. In some embodiments, any suitable CDL compliant modem or any modem capable of supporting continuous wave communications can be used.

Figure 3:
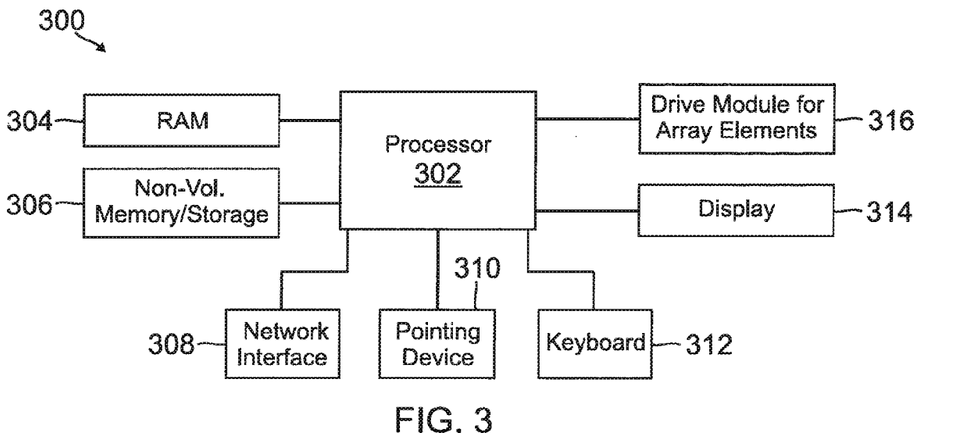
FIG. 3 is a schematic block diagram of a beam steering computer in accordance with one embodiment of the present invention.

FIG. 3 is a schematic block diagram of a beam steering computer 300 in accordance with one embodiment of the present invention. The beam steering computer 300 includes a processor 302 coupled to a random access memory (RAM) 304, a non-volatile memory or storage device 306, a network interface 308, a pointing device 310, a keyboard 312, a display 314, and a driver module 316 for driving array elements.

In other embodiments, the beam steering computer can include only some of these components. In some embodiments, the beam steering computer can have additional components.

In operation, the beam steering computer can operate as described previously in the discussion of FIG. 2. In some embodiments, the beam steering computer can operate as described subsequently in the discussion of FIG. 9.

Figure 4:
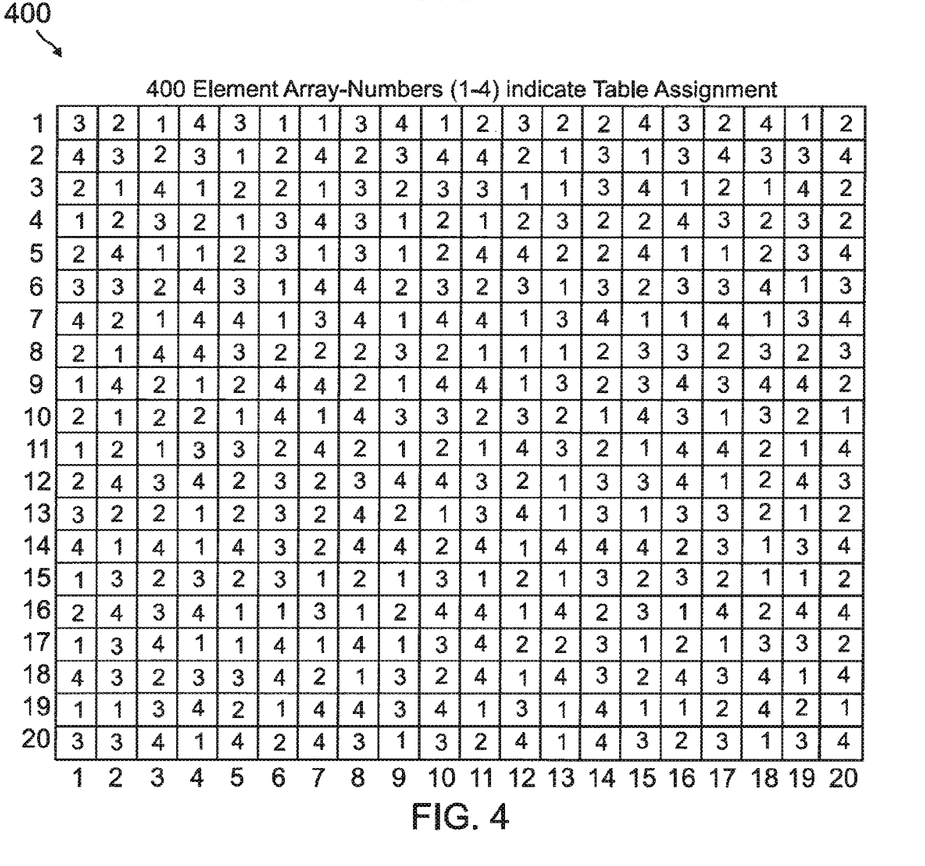
FIG. 4 is a table illustrating array element assignments for four discrete groups of active array elements in a active array radar system in accordance with one embodiment of the present invention.

FIG. 4 is a table 400 illustrating array element assignments for four discrete groups of active array elements in a active array radar system in accordance with one embodiment of the present invention. The table 400 illustrates a 20 by 20 two dimensional array, having a total of 400 elements, representing each of the elements of an active array antenna. Each element has been randomly assigned to one of four groups (1-4). In some embodiments, a beam steering computer can randomly assign the active array elements. In other embodiments, another means can be used to randomly assign the active array elements. In one such case, the table 400 is loaded, or received, by the beam steering computer before it operates the antenna in a continuous wave mode. In some embodiments, the array elements are systematically assigned (e.g., not by random).

In the illustrated embodiment, each element of the active array is randomly assigned to one of four groups. In most embodiments, the elements can be assigned to two or more groups. In one such embodiment, the elements can be assigned to more than four groups. In many embodiments, the number of elements assigned to each of the discrete groups is approximately equal. In the embodiment illustrated in FIG. 4, the table includes 400 elements. In other embodiments, the table can include any number of elements.

Figure 5:
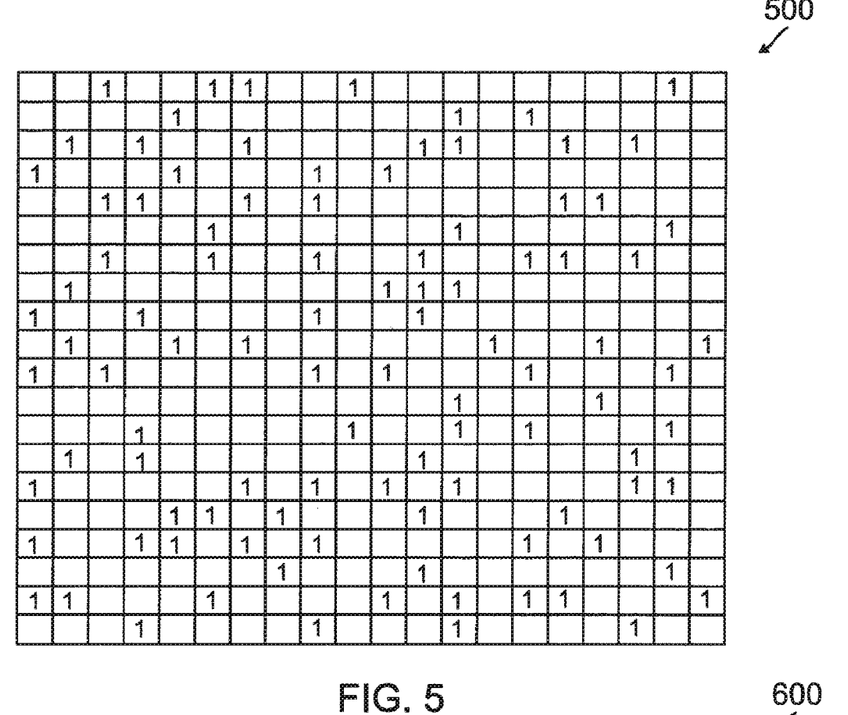
FIG. 5 is a table illustrating a first group of array elements to be activated in accordance with one embodiment of the present invention.

FIG. 5 is a table 500 illustrating a first group of array elements to be activated in accordance with one embodiment of the present invention. The table 500 includes the same number of elements, 400, as the table of FIG. 4. The elements in the table having a "1", primary elements, can be turned on, or activated, in the active array antenna at a particular time. The elements not having the "1", secondary elements, can be turned off, or deactivated, in the active array antenna at the same time that those "1" elements are activated. The "1" can be indicative of a first of four groups of elements.

Figure 6:
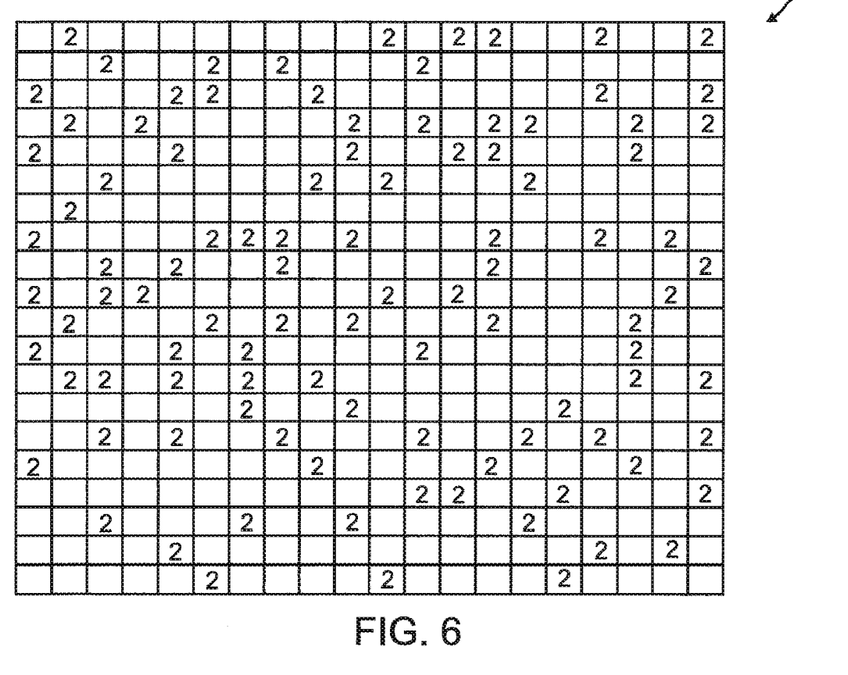
FIG. 6 is a table illustrating a second group of array elements to be activated in accordance with one embodiment of the present invention.

FIG. 6 is a table 600 illustrating a second group of array elements to be activated in accordance with one embodiment of the present invention. The table 600 includes the same number of elements, 400, as the table of FIG. 4. The elements in the table having a "2", primary elements, can be turned on, or activated, in the active array antenna at a particular time. The elements not having the "2", secondary elements, can be turned off, or deactivated, in the active array antenna at the same time that those "2" elements are activated. The "2" can be indicative of a second of four groups of elements.

Figure 7:
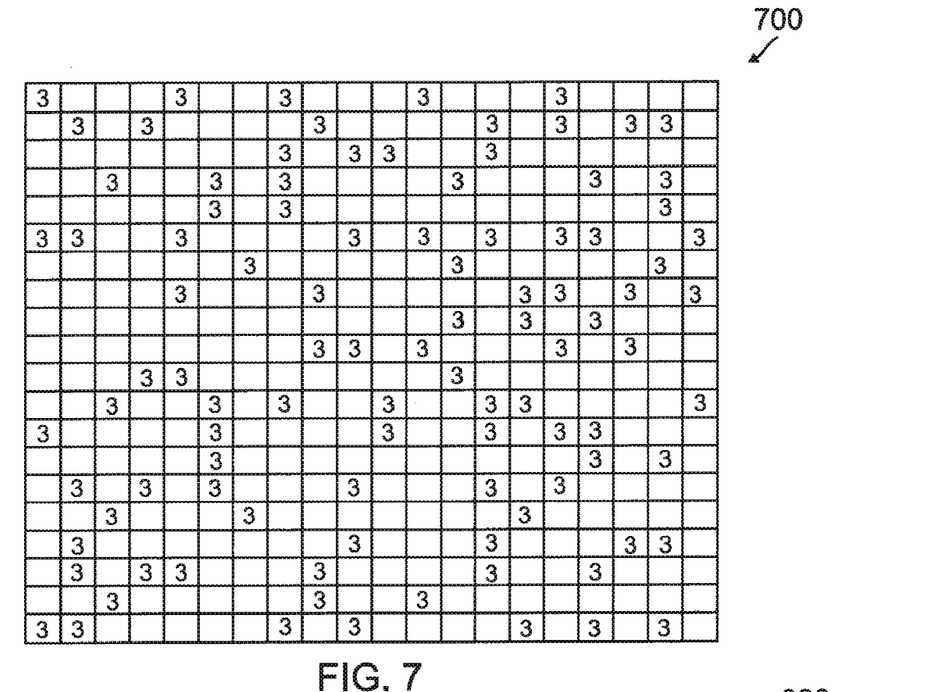
FIG. 7 is a table illustrating a third group of array elements to be activated in accordance with one embodiment of the present invention.

FIG. 7 is a table 700 illustrating a third group of array elements to be activated in accordance with one embodiment of the present invention. The table 700 includes the same number of elements, 400, as the table of FIG. 4. The elements in the table having a "3", primary elements, are to be turned on, or activated, in the active array antenna at a particular time. The elements not having the "3", secondary elements, are to be turned off, or deactivated, in the active array antenna, at the same time that those "3" elements are activated. The "3" can be indicative of a third of four groups of elements.

Figure 8:
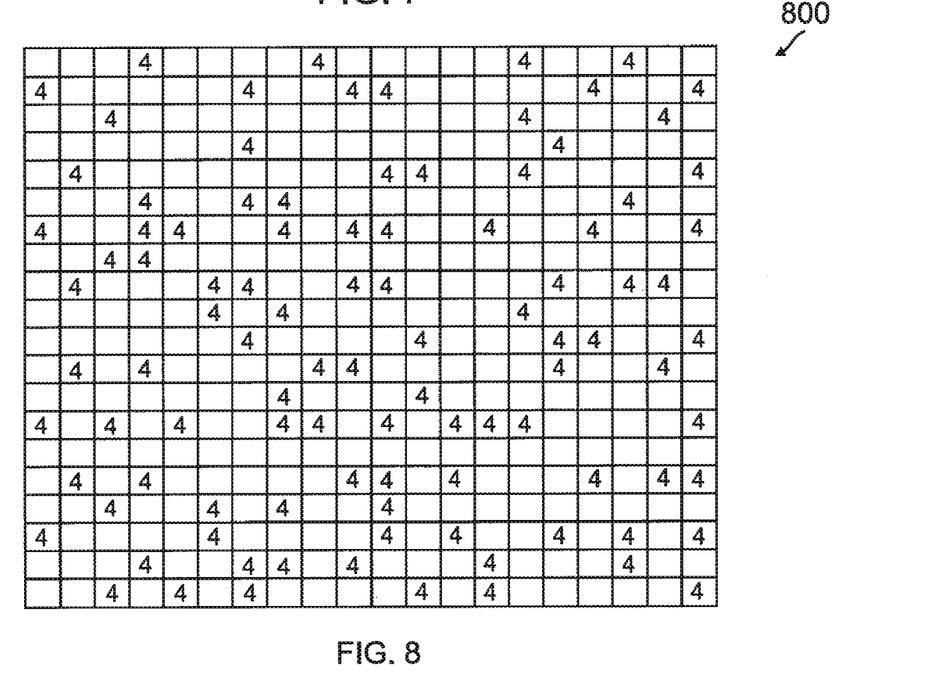
FIG. 8 is a table illustrating a fourth group of array elements to be activated in accordance with one embodiment of the present invention.

FIG. 8 is a table 800 illustrating a fourth group of array elements to be activated in accordance with one embodiment of the present invention. The table 800 includes the same number of elements, 400, as the table of FIG. 4. The elements in the table having a "4", primary elements, can be turned on, or activated, in the active array antenna at a particular time. The elements not having the "4", secondary elements, can be turned off, or deactivated, in the active array antenna at the same time that those "4" elements are activated. The "4" can be indicative of a fourth of four groups of elements.

In a number of embodiments, the beam steering computer can cycle through each of the tables described in FIGS. 5-8 for a period of time in order to generate a continuous wave signal. In some embodiments, the continuous wave signal can include a carrier signal at a particular frequency along with data modulated on to the carrier signal by a modem. The continuous wave signal can be driven with more power and at a greater range than a conventional modulated data signal. In several embodiments, the continuous wave signal appears continuous to a receiver despite the cycled activation of groups of antenna elements.

Figure 9:
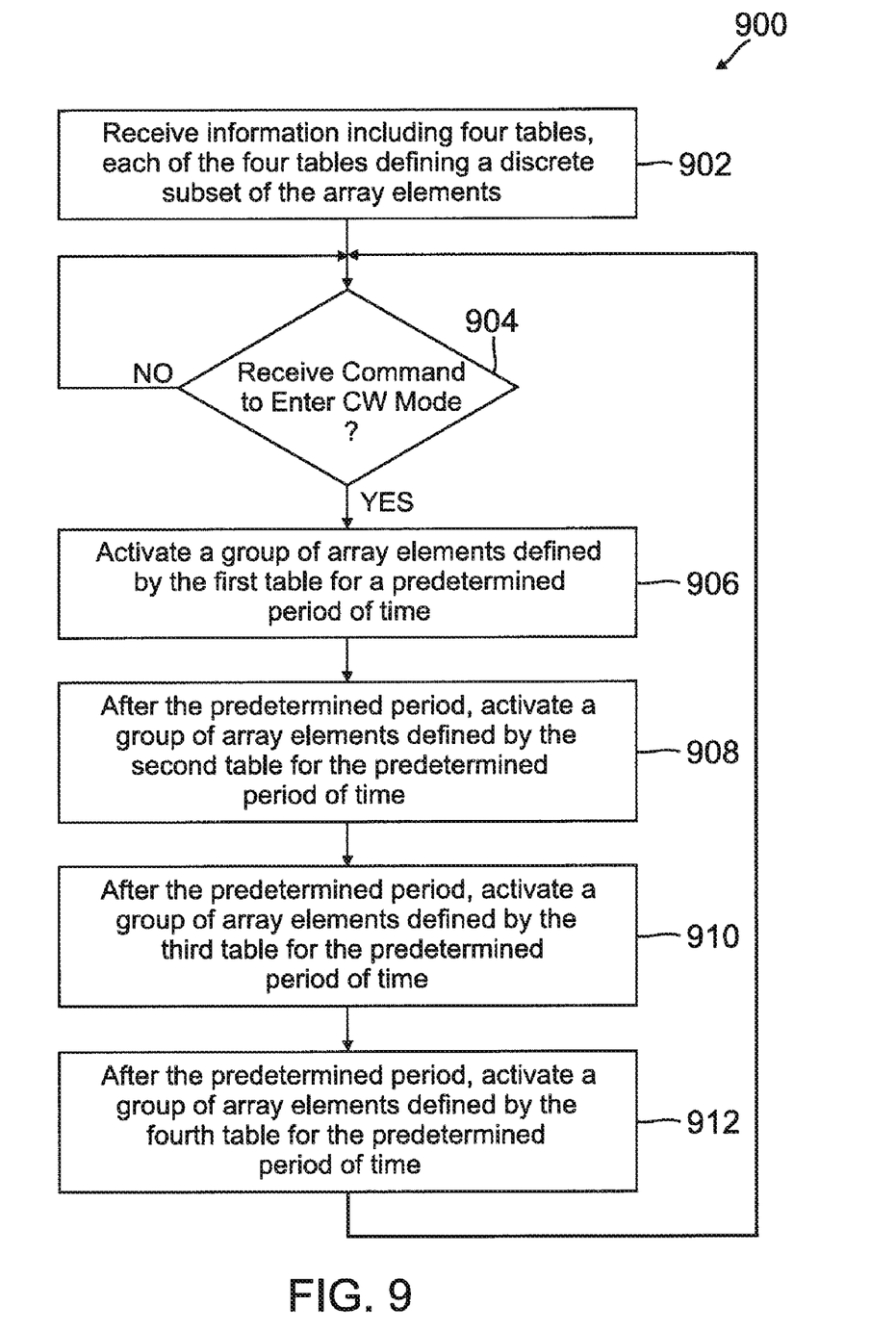
FIG. 9 is a flowchart of a process for operating an active array radar system in a continuous wave mode to enable data communication in accordance with one embodiment of the present invention.

FIG. 9 is a flowchart of a process 900 for operating an active array radar system in a continuous wave mode to enable data communication in accordance with one embodiment of the present invention. The process receives (902) information including four tables, where each of the four tables defines a discrete group of elements that is a subset of the total array elements of the active array radar system. In particular embodiments, the four tables illustrated in FIGS. 5 to 8 can be used. In other embodiments, the information received can include less than or greater than four tables. The process then determines (904) whether a command to enter a continuous wave mode has been received. If no such command has been received, the process returns to determining (904) whether the command has been received. In effect, the process can wait until the command to enter a continuous wave mode has been received. In some embodiments, the process performs actions typical of a radar system while the process waits for the command to enter a continuous wave mode.

If the command to enter a continuous wave mode is received, the process activates (906) a group of array elements defined by the first of the four tables for a predetermined period of time. In many embodiments, the first table includes a primary group of elements to be activated and a secondary group of elements to be deactivated. In many embodiments, the process activates the primary elements in the first table while deactivating the secondary elements. After the predetermined period of time for the first table, the process activates (908) a group of array elements defined by the second of the four tables for a predetermined period of time. In many embodiments, the second table includes a primary group of elements to be activated and a secondary group of elements to be deactivated. In many embodiments, the process activates the primary elements in the second table while deactivating the secondary elements. In many embodiments, the predetermined period of time for the second table is the same as the predetermined period of time for the first table.

After the predetermined period of time for the second table, the process activates (910) a group of array elements defined by the third of the four tables for a predetermined period of time. In many embodiments, the third table includes a primary group of elements to be activated and a secondary group of elements to be deactivated. In many embodiments, the process activates the primary elements in the third table while deactivating the secondary elements.

After the predetermined period of time for the third table, the process activates (912) a group of array elements defined by the fourth of the four tables for a predetermined period of time. In many embodiments, the fourth table includes a primary group of elements to be activated and a secondary group of elements to be deactivated. In many embodiments, the process activates the primary elements in the fourth table while deactivating the secondary elements. After the predetermined period of time for the fourth table, the process returns to determining (904) whether the command for entering the continuous wave mode is present. If so, the process can repeat the cycle of activating the elements in each of the tables, or groups of elements.

In the embodiment illustrated in FIG. 9, the process receives information including the four tables, where each of the four tables defines a discrete subset of the total array elements of the active array radar system to be activated. In other embodiments, the process does not receive the four tables but creates the four tables instead or other suitable data structures. In such case, the process determines the total number of elements in the active array antenna, randomly assigns a discrete subset of the total array elements to a group, and assembles a table for each group.

In a number of embodiments, each of the four tables received are sparse tables that are activated just 25 percent of the time while the continuous wave mode is enabled. In the illustrated embodiment, the four tables are cycled through in a modulo four fashion. In one embodiment, the predetermined time of operation for each cycle can be approximately 800 micro seconds. In operation, during the time that the continuous wave mode is enabled, the active array can be in a continuous wave transmit mode for 100 percent of the time while each array element is only in the continuous wave transmit mode for 25 percent of the time. In such case, substantial power savings can be achieved, and the active array radar system can be operated in a continuous wave mode with good range. In another embodiment, the power provided to the active array antenna can be lowered without cycling the elements in the modulo four fashion. In such case, the power consumption is higher and the range is reduced.

In one embodiment, the process can perform the illustrated actions in any order. In another embodiment, the process can omit one or more of the actions. In some embodiments, the process performs additional actions in conjunction with the process. In other embodiments, one or more of the actions are performed simultaneously.

Figure 10:
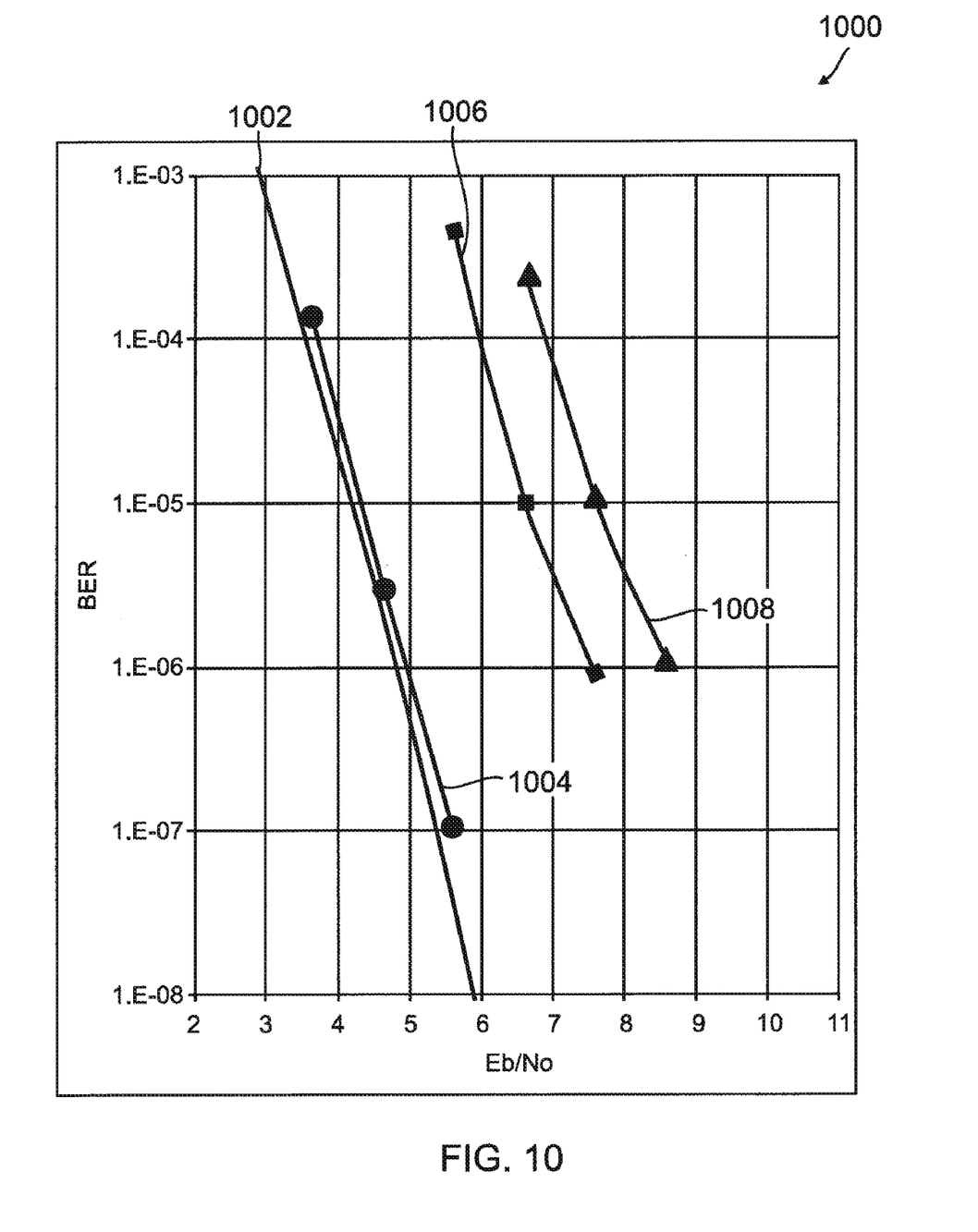
FIG. 10 is a graph of bit error rate for an active array radar system operating in a continuous wave mode in accordance with one embodiment of the present invention.

FIG. 10 is a graph 1000 of bit error rate for an active array radar system operating in a continuous wave mode in accordance with one embodiment of the present invention. In particular embodiments, the graph 1000 illustrates the performance of the active array radar system 102 of FIG. 1 communicating at high speeds with the continuous wave receiving device 104 of FIG. 1. The graph 1000 includes a vertical axis depicting bit error rate (BER) and a horizontal axis depicting a ratio of energy per bit to noise power spectral density, or Eb/No.

The graph 1000 also includes four waveforms. The first waveform 1002 illustrates the smallest possible bit error rate, a theoretical minimum. The second waveform 1004 illustrates a bit error rate of the radar system as the radar portion of the system is bypassed. The second waveform 1004 can be thought of as a system baseline for the bit error rate. The third waveform 1006 illustrates the performance of the active array radar system to the radiating elements of the antenna, or boom horn. The fourth waveform 1008 illustrates the bit error rate at the receiving device. In many embodiments, the bit error rate at the receiving device 1008 is relatively small compared to the bit error rate seen without transmission to the receiver 1006 (e.g., at the radiating elements of the antenna). In a number of embodiments, the graph 1000 of bit error rate indicates that an active array radar system can be operated in a continuous wave mode for communication with minimal and/or acceptable data loss.

Figure 11:
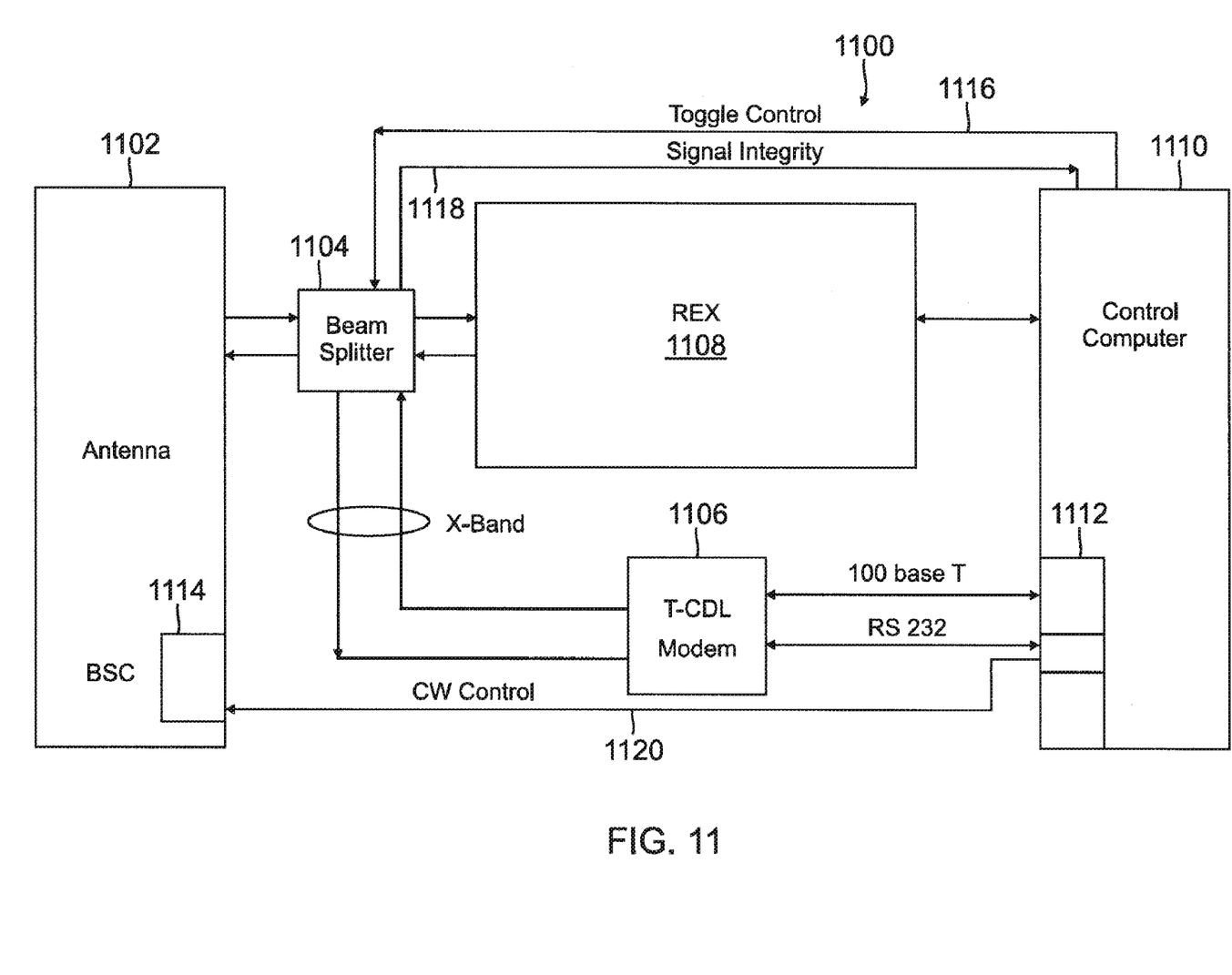
FIG. 11 is a schematic block diagram illustrating an active array radar system configured for use as a communication system and for use as a radar system in accordance with one embodiment of the present invention.

FIG. 11 is a schematic block diagram illustrating an active array radar communication system 1100 configured for use as a communication system and for use as a radar system in accordance with one embodiment of the present invention. The active array radar communication system 1100 includes an active array antenna system 1102, a beam splitter 1104, a modem 1106, a receiver/exciter (REX) 1108, and a control computer 1110. The control computer 1110 includes a couple of input/output (110) ports 1112 for communicating with other devices. The active array antenna system 1102 includes a beam steering computer 1114 for controlling steering devices (not shown) in the active array antenna and for controlling antenna array elements (not shown) in a continuous wave mode.

The beam splitter 1104 is coupled to the antenna system 1102 by transmit and receive channels. The beam splitter 1104 receives a toggle control signal 1116 from the control computer 1110. The beam splitter 1104 also generates a signal 1118 indicative of signal integrity measured at the beam splitter and provides it to the control computer 1110. The beam splitter 1104 is also coupled to the REX 1108 by transmit and receive channels. The REX 1108 is coupled by a bi-directional channel, or possibly by transmit and receive channels, to the control computer 1110. The beam splitter 1104 is also coupled to a CDL modem 1106 by transmit and receive channels. In many embodiments, the transmit and receive channels between the beam splitter 1104 and the CDL modem 1106 transport X-Band signals. In general, the frequency of X-Band signals can range from 7 to 12.5 GHz. The CDL modem 1106 is coupled to the control computer 1110 by two bi-directional channels supporting 100 base T and RS-232 protocols. The control computer 1110 provides a continuous wave mode control signal (CW Control) 1120 to the beam steering computer 1114 of the active array antenna system 1102.

The active array antenna system 1102 includes an active array radar antenna coupled to, and controlled by, the beam steering computer 1114. In a number of embodiments, the active array radar antenna of FIG. 2 can be used for the active array antenna system 1102. In several embodiments, the beam steering computer 1114 stores tables similar to those described above, in the discussions of FIGS. 4-8, for operating the active array antenna in a continuous wave mode. In many embodiments, the beam steering computer 1114 can execute a process, such as the process described in FIG. 9, for operating the active array radar antenna in the continuous wave mode. In such case, the beam steering computer 1114 can be initialized with the continuous wave mode tables or it can generate the tables. In addition, the beam steering computer 1114 can determine whether to operate the antenna in the continuous wave mode based on the continuous wave control signal 1120 generated by the control computer 1110.

The beam splitter 1104 can function as an electronic channel switch that switches the coupling of the transmit and receive channels of the antenna between the transmit and receive channels of either the REX 1108 or the modem 1106, based on the toggle control signal 1116 received by the control computer 1110. The beam splitter 1104 also generates the signal 1118 indicative of signal integrity measured at the beam splitter for the control computer 1110. The beam splitter can be implemented using electronic switches known in art which are capable of supporting the frequencies and the power levels typical of a signal generated by a CDL modem and/or a receiver/exciter. The beam splitter can further include circuitry suitable for measuring signal integrity and generating the signal 1118 indicative of the signal integrity.

The REX 1108 can operate similar to a transceiver for radar signals. The REX typically provides precision timing and generates a waveform, by way of up-conversion, amplification and filtering, to be transmitted. The REX provides similar functionality for received signals, including down-conversion. An example of a REX system is found in U.S. Pat. No. 6,977,610 to Brookner et al., the entire content of which is expressly incorporated herein by reference. The control computer 1110 can control the signals generated by REX 1108. The REX 1108 can provide any received signals, once down-converted and/or otherwise appropriately formatted, to the control computer 1110.

The modem 1106 can be a tactical common data link (T-CDL) type modem. In a number of embodiments, the CDL modem described above for FIG. 2 can be used. The modem 1106 typically operates in the X-Band. In some embodiments, the modem 1106 operates at approximately 9.85 GHz and can support data rates of up to 45 Mbps. In many embodiments, the modem uses phase modulation to exchange data with other communication terminals/nodes. In the illustrated embodiment, the modem 1106 is coupled by bi-directional channels, including a 100 base T channel and a RS-232 channel, to the I/O ports 1112 of the control computer 1110. The modem 1106 can send data to, and receive data from, the control computer 1110 via either the 100 base T channel or the RS-232 channel. In many embodiments, the control computer 1110 sends data to be transmitted to the modem 1106, and the modem forwards received data to the control computer.

The control computer 1110 can perform a number of functions. The control computer can control operation of the CDL modem, both in providing data to be transmitted and in processing received data. In some embodiments, the control computer 1110 can manage the transmission and receipt of synthetic aperture radar (SAR) maps (e.g., 1024 by 1024 images) and real time videos (e.g., MPEG videos) for use in identifying ground targets and threats with high resolution. The control computer 1110 can also control the beam steering computer 1114 and, more specifically, determine whether the beam steering computer operates the active array antenna in a continuous wave mode (e.g., or glitter mode). The control computer 1110 also controls the generation and receipt of radar signals by the REX 1108. The control computer 1110 can control the position of the beam splitter 1104 and whether the active array will be operating in a communication mode or a conventional radar mode. In a number of embodiments, the active array radar system uses pulsed radar signals when operated in a conventional mode. In one embodiment, the active array antenna system provides a large bandwidth communication channel when operated in the communication mode.

The control computer 1110 can include a processor coupled to a number of components typical of a computing device, including, for example, both volatile and non-volatile memory, a display, I/O ports, and various input devices such as a keyboard, mouse, and/or touch screen. In a number of embodiments, the control computer is configured for the control and operation of a vehicle such as an aircraft. In many embodiments, the control computer acts as a resource manager for the active array antenna. In such case, the control computer can operate the antenna as a communication device at times when it is not needed for radar functionality. A number of suitable algorithms and control mechanisms can be used by the control computer for efficient control of the antenna as a multi-purpose resource. In one embodiment, for example, the control computer operates the antenna in the radar mode by default. In such case, the control computer can operate the antenna in communication mode only when, for example, the control computer needs to send information or request information from another communication node/terminal. In other embodiments, other resource control algorithms can be used.

In many embodiments, the active array radar communication system 1100 of FIG. 11 can be implemented in conjunction with existing vehicles having radar systems. In such case, minimal additional hardware is needed for the vehicles. For example, a conventional vehicle having a radar system might only need additional hardware such as the CDL modem and the beam splitter, and software upgrades to the beam steering computer and control computers. In prior art systems attempting to provide similar high speed communication and radar functionality, a number of additional components are often required. Such required components can be expensive and can cause interference problems with existing components.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for operating a radar system, having an antenna comprising a plurality of active array elements, in a continuous wave mode to communicate information, the method comprising:
   receiving an instruction to enter the continuous wave mode;
   loading a plurality of tables, wherein each table comprises information indicative of a primary group of the active array elements to be activated and a secondary group of elements to be deactivated;
   receiving a communication signal to be transmitted; and
   providing, repeatedly, the communication signal, for a preselected period of time, to the primary group of elements of each of the plurality of tables,
   wherein at least one of the primary groups comprises randomly selected active array elements.

2. The method of claim 1:
   wherein the plurality of tables comprise four tables; and
   wherein the providing, repeatedly, the communication signal, for a preselected period of time, to the primary group of elements of each of the plurality of tables comprises:
      providing the communication signal, for a preselected period of time, to the primary group of elements of a first table of the four tables;
      providing the communication signal, for the preselected period of time, to the primary group of elements of a second table of the four tables;
      providing the communication signal, for the preselected period of time, to the primary group of elements of a third table of the four tables; and
      providing the communication signal, for the preselected period of time, to the primary group of elements of a fourth table of the four tables.

3. The method of claim 1, wherein the providing, repeatedly, the communication signal, for a preselected period of time, to the primary group of elements of each of the plurality of tables comprises providing, repeatedly, the communication signal, for a preselected period of time, to the primary group of elements of each of the plurality of tables in a round robin manner.

4. The method of claim 1:
   wherein the active array elements of each primary group are exclusive of other primary groups; and
   wherein each primary group includes a number of elements approximately about equal to a number of elements of other primary groups.

5. The method of claim 1, wherein the communication signal comprises phase modulated information.

6. The method of claim 1, wherein the communication signal is provided by a modem complying with the Common Data Link standard.

7. The method of claim 1, wherein the communication signal comprises an X-Band communication signal.

8. The method of claim 1, further comprising:
   receiving an instruction to exit the continuous wave mode;
   receiving information indicative of steering instructions for at least one of the plurality of active array elements; and
   adjusting the at least one of the plurality of active array elements based on the information indicative of steering instructions.

9. The method of claim 8, further comprising:
   receiving a radar signal; and
   providing the radar signal to the adjusted plurality of active array elements.

10. The method of claim 1, wherein the providing, repeatedly, the communication signal, for a preselected period of time, to the primary group of elements of each of the plurality of tables comprises providing, repeatedly, the communication signal, for a preselected period of time, to the primary group of elements of each of the plurality of tables, at a data rate of approximately 45 mega bits per second.

11. The method of claim 1, wherein the number of the active array elements in the primary groups is about equal.

12. The method of claim 1, wherein the active array elements in any one of the primary groups are exclusive.

13. A method for operating a radar system, having an antenna comprising a plurality of active array elements, a continuous wave mode to communicate information, the method comprising:
   receiving an instruction to enter the continuous wave mode;
   creating a plurality of tables, wherein each table comprises information indicative of a primary group of the active array elements to be activated and a secondary group of elements to be deactivated;
   receiving a communication signal to be transmitted; and
   providing, repeatedly, the communication signal, for a preselected period of time, to the primary group of elements of each of the plurality of tables,
   wherein at least one of the primary groups comprises randomly selected active array elements.

14. The method of claim 13, wherein the number of the active array elements in the primary groups is about equal.

15. The method of claim 13, wherein the active array elements in any one of the primary groups are exclusive.

16. A radar system for communicating information in a continuous wave mode, the system comprising:
   an active array radar antenna having a plurality of array elements;
   a modem configured to generate a communication signal to be transmitted; and
   a computer, coupled to the active array antenna, the computer configured to:
      load a plurality of tables, wherein each table comprises information indicative of a primary group of the active array elements to be activated and a secondary group of elements to be deactivated;
      receive the communication signal; and
      provide, repeatedly, the communication signal, for a preselected period of time, to the primary group of elements of each of the plurality of tables,
   wherein at least one of the primary groups comprises randomly selected active array elements.

17. The system of claim 16:
   wherein the plurality of tables comprise four tables; and
   wherein the computer is further configured to:
      provide the communication signal, for a preselected period of time, to the primary group of elements of a first table of the four tables;
      provide the communication signal, for the preselected period of time, to the primary group of elements of a second table of the four tables;
      provide the communication signal, for the preselected period of time, to the primary group of elements of a third table of the four tables; and
      provide the communication signal, for the preselected period of time, to the primary group of elements of a fourth table of the four tables.

18. The system of claim 16, wherein the number of the active array elements in the primary groups is about equal.

19. The system of claim 16, wherein the active array elements in any one of the primary groups are exclusive.

20. A method for operating a radar system, having an antenna comprising a plurality of active array elements, a continuous wave mode to communicate information, the method comprising:
   receiving an instruction to enter the continuous wave mode;
   creating a plurality of tables, wherein each table comprises information indicative of a primary group of the active array elements to be activated and a secondary group of elements to be deactivated;
   dividing, randomly, the plurality of active array elements into each of the primary groups such that the active array elements in any one of the primary groups are exclusive, and a number of the elements in the primary groups is about equal;
   receiving a communication signal to be transmitted; and
   providing, repeatedly, the communication signal, for a preselected period of time, to the primary group of elements of each of the plurality of tables.

* * * * *